(12) United States Patent
Musci et al.

(10) Patent No.: US 11,738,614 B2
(45) Date of Patent: Aug. 29, 2023

(54) TWO-PIECE VERTICAL CONTROL ARM BUSHING

(71) Applicant: RESEARCH & MANUFACTURING CORPORATION OF AMERICA, Linden, NJ (US)

(72) Inventors: John P. Musci, Freehold, NJ (US); Carlos Guerreiro, Metuchen, NJ (US); Joe Berta, Ridgefield, NJ (US); Alan Lambert, Colts Neck, NJ (US)

(73) Assignee: RESEARCH & MANUFACTURING CORPORATION OF AMERICA, Linden, NJ (US)

( * ) Notice: Subject to any disclaimer, the term of this patent is extended or adjusted under 35 U.S.C. 154(b) by 81 days.

(21) Appl. No.: 16/398,938

(22) Filed: Apr. 30, 2019

(65) Prior Publication Data

US 2019/0329618 A1 Oct. 31, 2019

Related U.S. Application Data

(60) Provisional application No. 62/664,310, filed on Apr. 30, 2018.

(51) Int. Cl.
*B60G 7/00* (2006.01)
*B60G 7/02* (2006.01)
*F16F 1/38* (2006.01)

(52) U.S. Cl.
CPC ............ *B60G 7/001* (2013.01); *B60G 7/008* (2013.01); *B60G 7/02* (2013.01); *F16F 1/3835* (2013.01);

(Continued)

(58) Field of Classification Search
CPC ...... B60G 2204/143; B60G 2204/1431; B60G 2204/1432; B60G 2204/148;
(Continued)

(56) References Cited

U.S. PATENT DOCUMENTS 2,855,212 A * 10/1958 Houser .................. B60G 7/001
280/6.157
3,392,971 A 7/1968 Herbenar et al.
(Continued)

FOREIGN PATENT DOCUMENTS

CN 201856894 U 6/2011
CN 202138178 U 2/2012
(Continued)

*Primary Examiner* — Laura Freedman
(74) *Attorney, Agent, or Firm* — Nolte Lackenbach Siegel; Myron Greenspan (57) ABSTRACT

A bushing, for use with a control arm, has first and second mating segments that can be mated and assembled to form a central portion to be received within a circular opening in the control arm and the central portion has an outer diameter corresponding to the diameter of the circular opening. Each segment includes a cap or head portion having a diameter dimensioned to abut against one of the surfaces of the control arm and has a central bore. A bushing sleeve has a length equal to a axial length of the assembled bushing and an outer diameter incrementally greater than the diameter of the central bore so that the sleeve can be press fit within the bore to immobilize the segments when they are in contact with the control arm and become resistant to separation.

20 Claims, 6 Drawing Sheets

(52) U.S. Cl.
CPC ...... *F16F 1/3842* (2013.01); *B60G 2204/143* (2013.01); *B60G 2204/148* (2013.01); *B60G 2204/41* (2013.01); *B60G 2206/72* (2013.01); *F16F 2224/025* (2013.01); *F16F 2224/0208* (2013.01); *F16F 2226/04* (2013.01)

(58) Field of Classification Search
CPC .......... B60G 2204/41; B60G 2204/416; B60G 2206/122; B60G 2206/72; B60G 2206/73; B60G 2206/90; B60G 2206/91; B60G 7/001; B60G 7/005; B60G 7/008; B60G 7/02; F16F 1/3735; F16F 1/3835; F16F 1/3842; F16F 2224/0208; F16F 2224/025; F16F 2226/04

See application file for complete search history.

(56) References Cited

U.S. PATENT DOCUMENTS

| | | | |
|---|---|---|---|
| 3,951,477 A | 4/1976 | Townshend | |
| 5,275,429 A * | 1/1994 | Bunker | B60G 7/02 |
| | | | 280/124.177 |
| 5,413,373 A | 5/1995 | Evans et al. | |
| 5,687,948 A * | 11/1997 | Whiteford | F16F 1/3814 |
| | | | 248/635 |
| 5,707,073 A * | 1/1998 | Stuker | B60G 21/0551 |
| | | | 280/124.125 |
| 5,941,511 A | 8/1999 | Dawda et al. | |
| 6,065,742 A | 5/2000 | Whiteford | |
| 6,180,883 B1 * | 1/2001 | Copeland | H05K 5/0073 |
| | | | 174/152 G |
| 6,354,614 B1 * | 3/2002 | Ham, Jr. | B60K 5/1241 |
| | | | 267/293 |
| 6,666,438 B2 * | 12/2003 | Nakagawa | F16F 1/3814 |
| | | | 267/140.12 |
| 7,261,365 B2 * | 8/2007 | Dickson | B60G 99/002 |
| | | | 248/635 |
| 7,416,174 B2 * | 8/2008 | Dickson | F16F 15/08 |
| | | | 267/141.1 |
| 7,959,168 B2 * | 6/2011 | Kiselis | B60G 9/003 |
| | | | 280/124.106 |
| 8,226,066 B2 * | 7/2012 | Kubat | F16F 3/093 |
| | | | 248/634 |
| 8,414,002 B2 * | 4/2013 | Yu | B60G 7/001 |
| | | | 280/124.134 |
| 8,424,855 B1 | 4/2013 | Verbowski | |
| 8,500,149 B1 | 8/2013 | Nazarian, Jr. et al. | |
| 8,757,648 B1 | 6/2014 | Winter | |
| 9,548,144 B2 * | 1/2017 | Blazic | H05K 5/0073 |
| D784,881 S | 4/2017 | Orlando | |
| 9,968,981 B2 * | 5/2018 | Verbowski | F16C 11/0614 |
| 10,054,179 B2 * | 8/2018 | Trotter | F16F 1/3842 |
| 10,155,424 B1 * | 12/2018 | Elterman | B60G 7/02 |
| 10,422,372 B2 * | 9/2019 | Cox | F16F 1/3863 |
| 10,570,977 B2 * | 2/2020 | King | F16F 1/3935 |
| 2003/0057622 A1 * | 3/2003 | Bovio | B60G 11/003 |
| | | | 267/281 |
| 2006/0083585 A1 * | 4/2006 | Lew | B62D 21/155 |
| | | | 403/365 |
| 2008/0163453 A1 | 7/2008 | Joseph | |
| 2008/0174082 A1 | 7/2008 | Bunker | |
| 2010/0038876 A1 | 2/2010 | Bunker | |
| 2020/0216116 A1 * | 7/2020 | Backulja | F16B 33/002 |

FOREIGN PATENT DOCUMENTS

| | | | | |
|---|---|---|---|---|
| CN | 103241086 A | | 8/2013 | |
| JP | 08025931 A | * | 1/1996 | |
| JP | 2005076751 A | * | 3/2005 | |

* cited by examiner

TWO-PIECE VERTICAL CONTROL ARM BUSHING

BACKGROUND OF THE INVENTION

1. Field of the Invention

The present invention generally relates to automotive suspension systems and, more specifically, to a two-piece vertical control arm bushing for a vehicle control arm assembly.

2. Description of the Prior Art

Front and rear suspensions of numerous automotive vehicles typically include a control arm. Vehicles equipped with control arms are used in conjunction with the suspensions of the vehicles in order to manage the motions of the wheels relative to the motions of the vehicle body.

Each control arm assembly typically includes the control arm and control arm bushings that are provided within spaced apertures in the control arm. Each of the control arm bushings is typically fabricated from rubber and is press-fit into a respective aperture in the control arm using an arbor press or other suitable device.

Each of the control arm bushings is typically sized to protrude slightly outwardly from each end of the aperture within which it resides. Inserted into each of the control arm bushings is a metallic tubular insert or sleeve that has a bore for receiving a pin or bolt for interconnecting the bushing and the control arm assembly to front wheel suspension components.

Over extended periods of time, factory-installed rubber control arm bushings used for cars, trucks and sport utility vehicles (SUV) deteriorate as does vehicle performance. For example, torque forces imposed on the vehicle during high-speed cornering or during travel over uneven terrain compresses the rubber bushings to the extent that the rubber may become permanently deformed. Permanent deformation of the bushing can result in loss of alignment (i.e., caster and camber) of the front wheels of the vehicle. In addition, permanent deformation of the rubber bushing can result in loss of steering response and reduced vehicle control that affects the overall safety of the vehicle.

Deterioration of the rubber bushings can also occur due to exposures to oils, road salt, chemicals and other corrosive substances as well as exposure to atmospheric contaminants such as ozone and smog which can attack and degrade the rubber over time. Furthermore, rubber is known to shrink and harden over time due to breakdown of polymers in the rubber. The deleterious effects on vehicle performance as a result of worn, damaged or hardened control arm bushings is even more pronounced when vehicles are used under extreme conditions such as in off-road driving and during competition such as racing.

Once control arm bushings become worn, the entire control arm assembly is frequently removed from the vehicle and replaced with a new control arm assembly. Typically, the new control arm assembly also includes control arm bushings manufactured of rubber and are, therefore, subject to the same deleterious affects of the original rubber bushings. However, the metallic control arm itself is typically undamaged and can be re-used once fitted with new control arm bushings. As may be appreciated, replacing the entire control arm assembly as opposed to only replacing the control arm bushings results in significantly increased repair costs.

There exists a need, therefore, for control arm bushings that can be used as replacements for worn rubber control arm bushings. Furthermore, there exists a need for control arm bushings that can be customized for use with numerous vehicles and that can withstand the weight and torque forces that are known to degrade factory-installed rubber bushings. Equally importantly, there exists a need for a control arm bushing that can be easily, quickly and efficiently installed without the need for replacing the entire control arm assembly to significantly reduce replacement service costs.

SUMMARY OF THE INVENTION

It is an object of the invention to provide a vertical control arm bushing that overcomes the disadvantages of prior art bushings.

It is another object of the invention to provide a two-piece vertical control arm bushing that is simple in construction and economical to manufacture.

It is still another object of the invention to provide a two-piece vertical control arm bushing as in the previous objects that can be used with OEM control arm assemblies and used as after market control arm bushings to replace damaged bushings.

It is yet another object of the invention to provide a two-piece vertical control arm bushing that can be customized to be used with numerous vehicle control arms.

It is a further object of the invention to provide a two-piece vertical control bushing that is easy to assemble and does not require high pressure presses to press fit the bushings within associated openings within the control arm.

It is still a further object of the invention to provide a two-piece control arm bushing as in the previous objects that reduces the cost of replacement of worn or damaged bushings.

In order to achieve the above objects as well as others that will become evident hereinafter, a bushing in accordance with the present invention, for use with a control arm having upper and lower surfaces and a circular opening defining a vertical axis and a diameter $D_e$, comprises first and second mating segments defining an axis when mated and assembled and an outer diameter substantially corresponding to the diameter $D_e$. Each segment includes a cap or head portion dimensioned to abut against another one of said upper and lower surfaces of said control arm and having a central bore having a predetermined diameter. A bushing sleeve is provided that has a length substantially equal to the fully mated bushing along the vertical axis and an outer diameter incrementally greater than said predetermined diameter to allow said bushing sleeve to be inserted through said central bore in a press fit relationship in order to maintain said mating segments in assembled condition. The two segments of the two piece vertical control arm bushing are inserted into the circular opening from opposing or opposite sides of the control arm and coaxially aligned prior to being mated. After the segments have been mated the bushing sleeve is inserted through the central bore. Simple shop tools can be used to assemble the bushing.

BRIEF DESCRIPTION OF THE DRAWINGS

The above and other aspects, features and advantages of the present invention will be more apparent from the following description when taken in conjunction with the accompanying drawings, in which.

DETAILED DESCRIPTION

Figure 1:
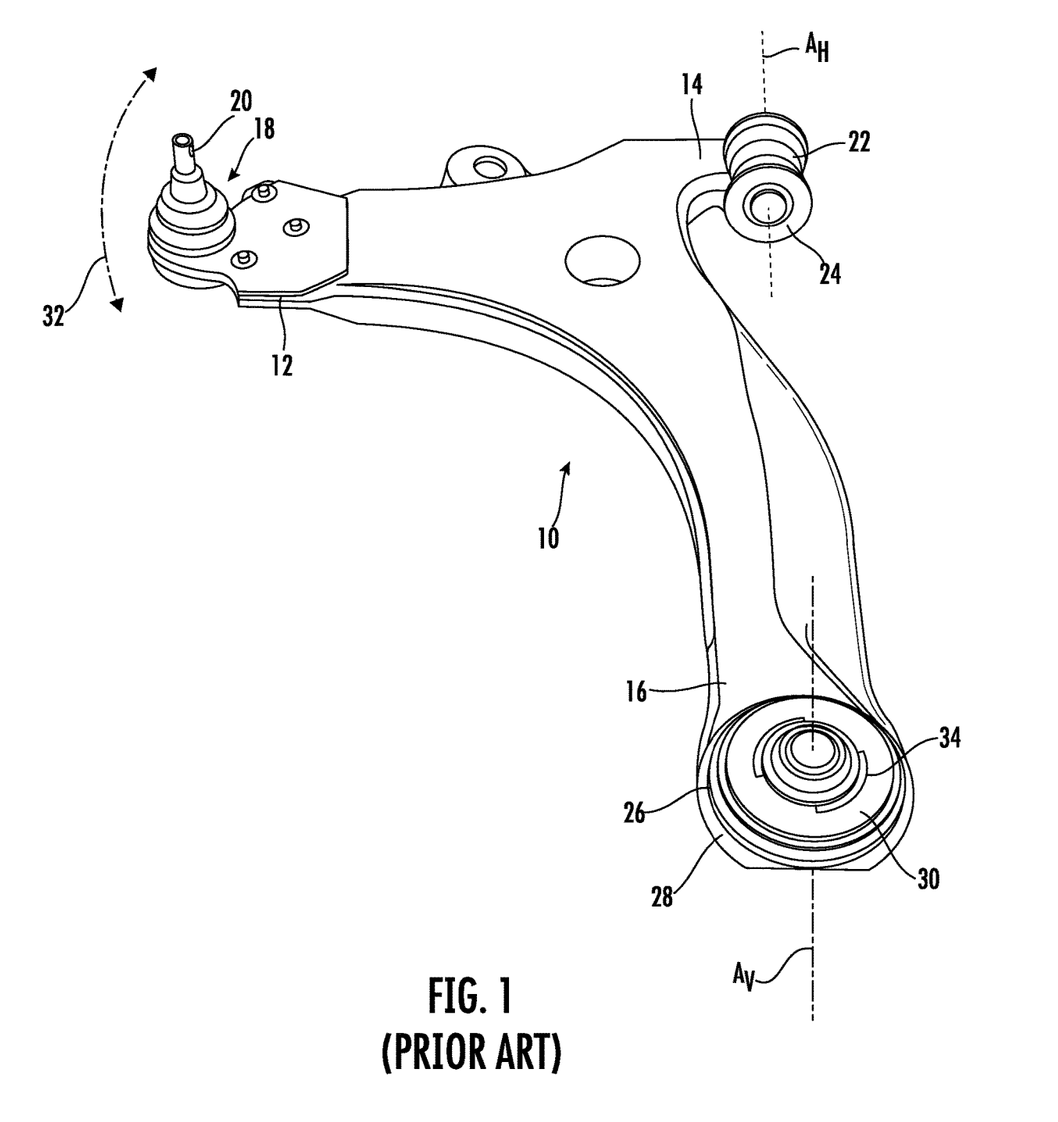
FIG. 1 is a perspective image of a prior art control arm assembly illustrating both forward or front bushing having a generally horizontal axis and a rear bushing having a generally vertical axis.

Referring now specifically to the figures, in which identical or similar parts designated by the same reference numerals throughout, and first referring to FIG. 1, a prior art control arm is generally designated by the reference numeral 10.

The control arm assembly 10 is generally T-shaped as viewed in FIG. 1, having free end portions 12, 14 and 16. A ball joint assembly 18 is shown mounted on or supported by the portion 12 that includes an upwardly projecting stem 20 commonly used to secure the control arm assembly 10 to a suspension component of a vehicle.

Provided at the portion 14 is a cylindrical front or forward tubular member 22 that defines a generally horizontal axis $A_H$ and houses a front bushing 24 that is received and supported by the cylindrical front or forward tubular member 22. The axis of the front bushing 24 is generally coextensive with the horizontal axis $A_H$.

The other end portion 16 forms a rear or back end 26 having upper and lower surfaces, as shown, and a circular opening 28 that defines a substantially vertical axis $A_V$. Housed within and supported by the rear or back end 26 is a vertical rear bushing 30 that defines an axis that is coextensive with the vertical axis $A_V$ of the circular opening 28.

During normal operation of the vehicle, the control arm portion 12, that carries the ball joint assembly 18, moves upwardly and downwardly generally along directions represented by the arrow 32. It will be appreciated that as the portion 12 moves up and down more extensively than the vertical movements of the portions 14, 16 the associated bushings 24 and 30 will be exposed to stresses including compressions and stretching. Since the movements of the front or forward portion 14 will be essentially about the horizontal axis H the front bushing 24 may be somewhat stressed but much less so than the rear vertical bushing 30. It is clear that rocking or pivoting movements of the control arm portion 16 while the central portion of the rear bushing 30 remains substantially vertical this will cause significant stresses and flexing of the rubber material of which the rear bushing is formed. While some efforts have been made to prevent premature deterioration of the rear bushing 30 due to such constant stresses, the bushing 30 is still exposed to significant stresses that cause the material to break down and deteriorate. Shown in FIG. 1 are slits or openings 34 as one proposed solution designed to reduce the amount of stresses applied to the rubber material when the portion 16 rocks from side to side, as viewed in FIG. 1, while the central part of the bushing 30 remains substantially vertical. Therefore, it is normally not a question of whether the rear bushings will ultimately deteriorate and fail but when or how quickly this will occur. Replacing the bushing 30 when it fails with a similar bushing will extend the life of the control arm assembly but the replacement bushing will also, in time, deteriorate and fail. Each time that a bushing, including an OEM bushing, fails it must be removed from the opening 28 and replaced by a new bushing. However, these bushings are press fit under significant compression forces and replacement of a failed bushing and replacement with a new bushing is not always simple and, frequently, if not always, requires special tools such as high power presses. This increases the time and labor charges for the owner of the vehicle.

Figure 2:
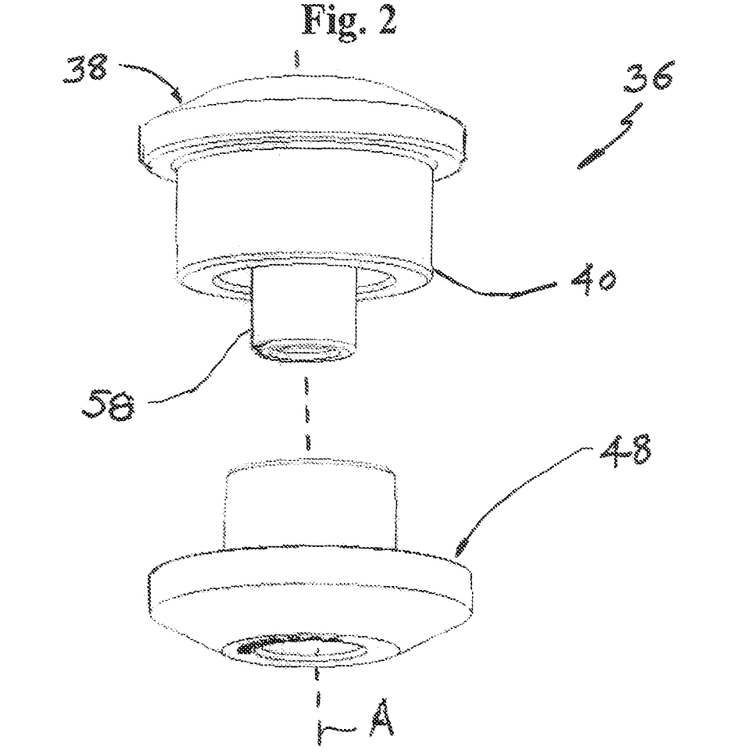
FIG. 2 is an exploded prospective view of a two-piece vertical control arm bushing in accordance with the present invention aligned in positions prior to being mated and fully assembled.

Referring to FIG. 2, a new vertical control arm bushing in accordance with the invention is shown and designated by the reference numeral 36. The bushing 36, as viewed in FIG. 2, includes an upper female segment 38. However, it will be appreciated that relative positional designations are not critical and the female segment 38 can also be positioned below the control arm and, therefore, be the lower segment.

Figure 3:
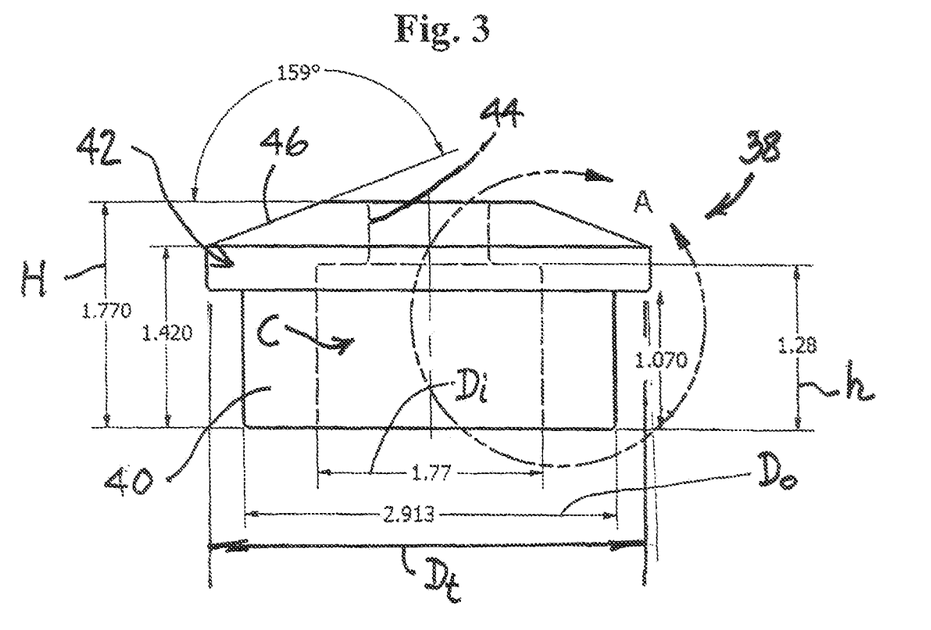
FIG. 3 is a side elevational view of the female control arm bushing segment shown in FIG. 2.
Figure 4:
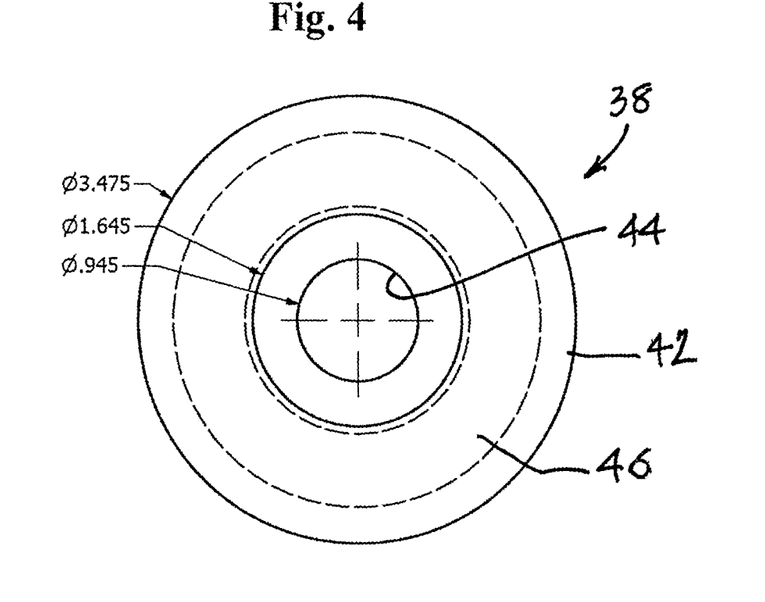
FIG. 4 is a top plan view of the bushing segment shown in FIG. 3.
Figure 5:
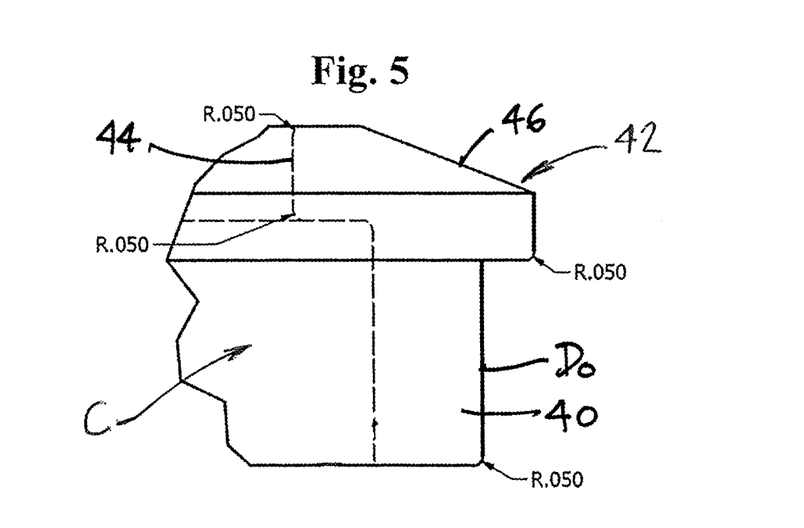
FIG. 5 is a enlarged fragmented detail of the region A shown in FIG. 3.

Referring to FIGS. 3-5, the female segment 38 includes an annular portion 40 that has an outside diameter $D_o$ and a chamber C with an inner diameter $D_i$ (FIG. 3). Provided at one end of the annular portion 40 is a head or cap portion 42 that has an outer diameter $D_t$ and a cylindrical opening or bore 44, the segment 38 having an overall height H (FIG. 3). The head or cap portion 42 includes an inclined surface 46. The chamber C with internal diameter $D_i$ somewhat extends into the head or cap portion 42, as shown in FIGS. 3 and 5, that provides an overall axial length or height for the inner chamber C of h (FIG. 3).

Figure 6:
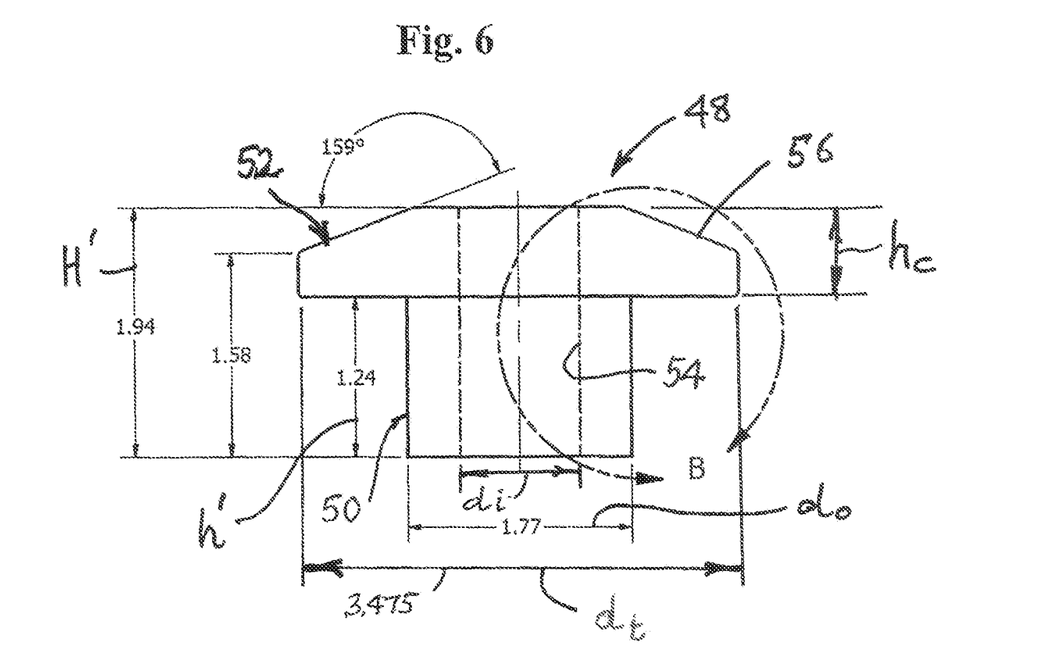
FIG. 6 is a side elevational view of the lower male control arm bushing segment shown in FIG. 2.
Figure 7:
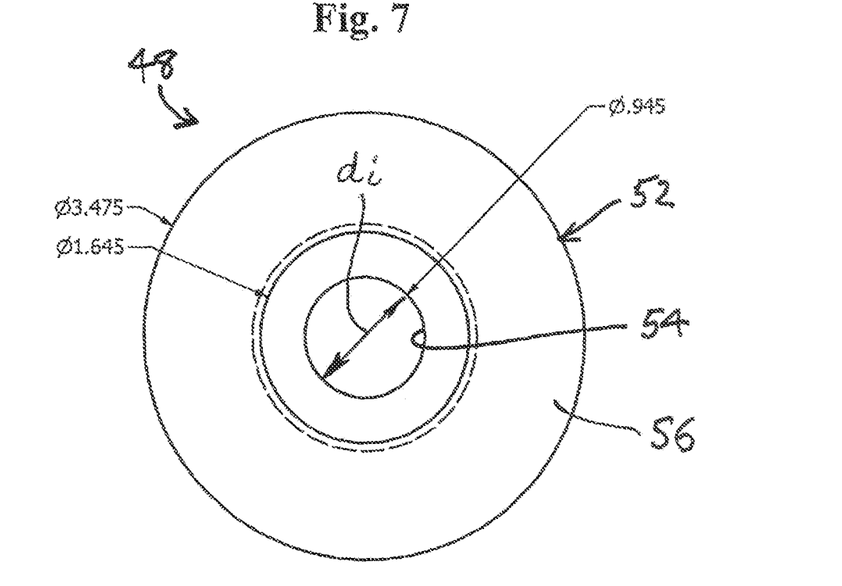
FIG. 7 is a top plan view of the bushing segment shown in FIG. 6.
Figure 8:
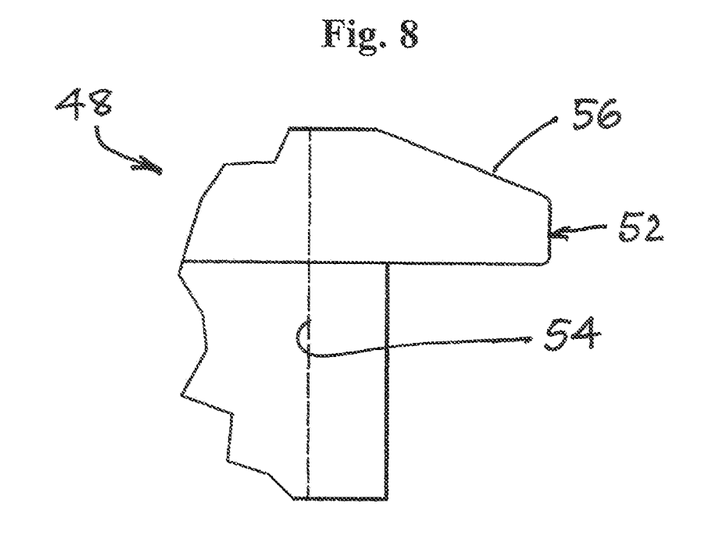
FIG. 8 is an enlarged fragmented detail of the region B shown in FIG. 6.

Referring to FIGS. 6-8, the lower male segment 48 also has an annular portion 50 that has an outer diameter $d_o$ and an internal diameter $d_i$ as viewed in FIGS. 6 and 7. The male segment 48 also includes a head or cap portion 52 with an outer diameter $d_t$ and a cylindrical opening, channel or bore 54, and also formed with an inclined surface 56.

Figure 9:
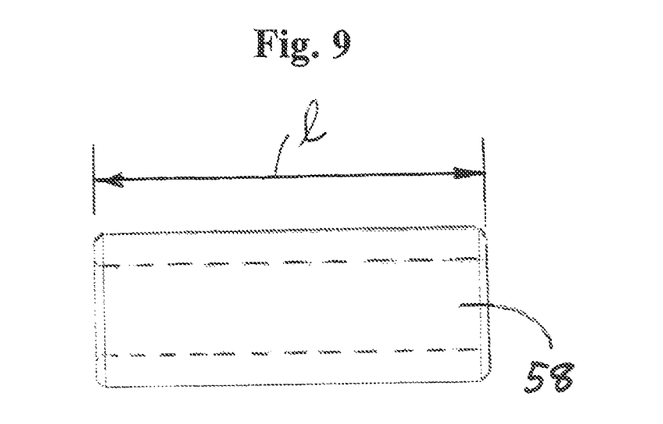
FIG. 9 is a side elevational view of a bushing sleeve used to secure the coaxially aligned and assembled segments shown in FIGS. 3-8 and for providing a central channel through which a bolt or pin can pass for attachment of the control arm to a component of a suspension system of a vehicle.
Figure 10:
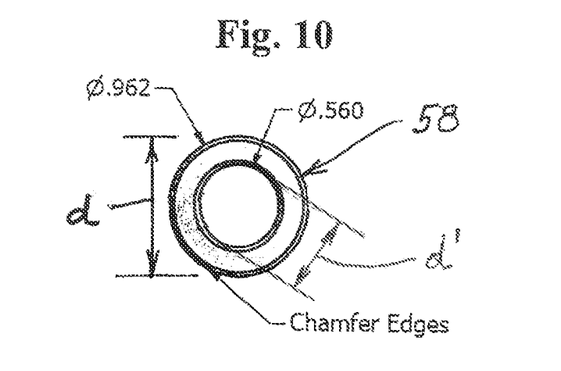
FIG. 10 is a side elevational view of the bushing sleeve shown in FIG. 9.
Figure 11:
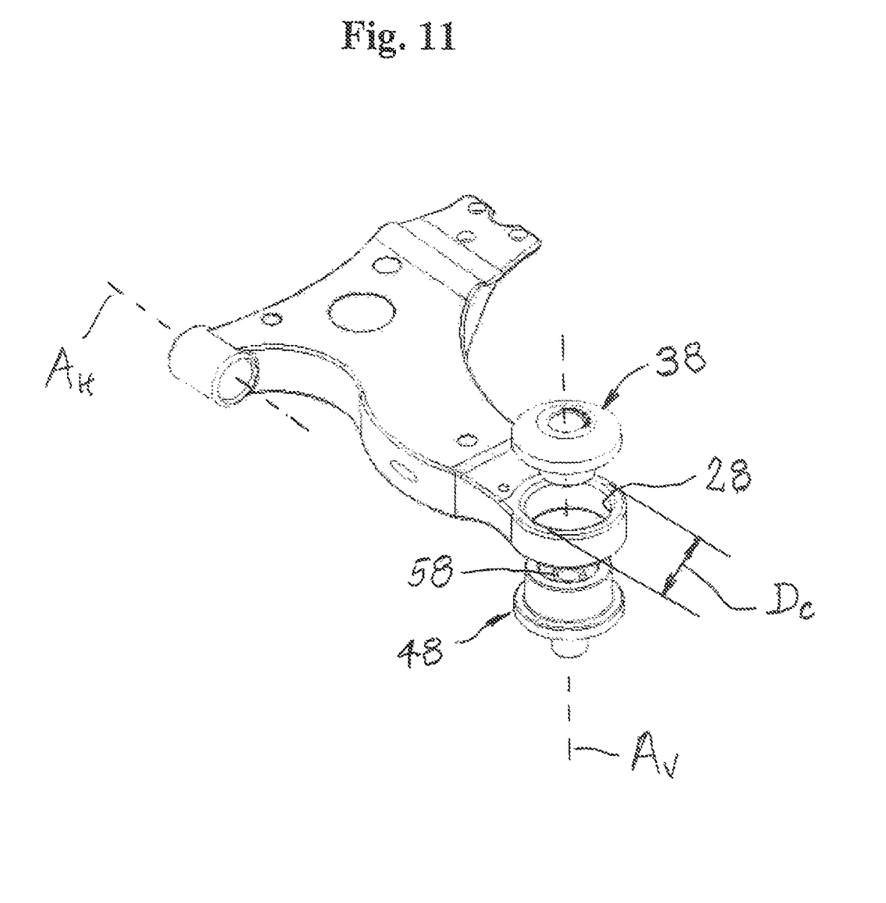
FIG. 11 is a perspective view of a control arm with the two-piece vertical control arm bushing in accordance with the invention showing the upper and lower bushing segments aligned and ready to be assembled and secured to the control arm.

Referring to FIGS. 9 and 10 a bushing or sleeve insert 58 is in the shape of a tubular member preferably provided with chamfered edges at both axial ends thereof. The bushing or sleeve 58 has an external diameter d and an internal diameter d'.

It will be noted from the dimensions of the two segments 38 and 48 that the outer diameter $d_o$ of the segment 48 is substantially equal to the diameter $d_i$ of the upper segment 38. When coaxially aligned with the circular opening 28 on opposite sides of the portion 16 to be aligned coaxially with the vertical axis $A_V$ the annular portion 50 can be inserted into or received within the annular portion 40 of the upper segment 38 substantially the full axial height h of the interior cavity or chamber C. The axial length or height of the chamber C in the upper portion is slightly greater than the axial length h' so that the entire annular portion 50 can be received within the interior cavity or chamber C of the upper segment with maximum penetration to insure minimum spacing between the heads or caps 42, 52 and reliable contact of the heads or caps with the control arm. This can be achieved with simple shop tools readily available in a shop or service station including a clamp, hammer or the like.

Once the upper and lower segments are fully mated the bushing sleeve 58 is inserted into the cylindrical opening or bore 54. The outer diameter d of the sleeve 58 is selected to be somewhat greater than the inside diameter of the bores or channels 44 and 54 so that a press fit is created when the sleeve is inserted into the two segments. The axial 1 length of the sleeve 58 is selected to be equal to the axial length or height H of the segment 38 and the axial thickness of the head or cap 52 of the segment. In the example shown, the axial length or height H of the upper segment 38 is equal to H or 1.770" (FIG. 3). Once fully mated, the annular portion 50 is fully received within the cavity or chamber C of the upper segment 38. The head or cap portions 42, 52 abut against the opposing surfaces of the control arm portion 16. The length of the sleeve 58 is, therefore, selected to be 2.47" which is the sum of the height H or 1.770" of the segment 38 and the axial thickness of the head or cap portion 52, shown to be 0.7", for a total of 2.47". The chamfered axial ends of the bushing sleeve 58 facilitate insertion of the sleeve without damage to the internal surface of the segments 38, 48.

It will be evident that the same two-piece bushing construction can be used in connection with numerous size and style control arms by selecting suitable outer diameters $D_o$ of the annular portion 40 to be compatible with the circular or cylindrical openings 28 in the control arm and by selecting the diameter d' to accommodate the different bolts or pins that extend through the bushing for attachment to the suspension components.

The upper or female and the lower male segments can be made from any suitable material commonly used for manufacturing bushings, such as rubber, or different formulations thereof, and the bushing sleeve 58 is typically formed of steel. The diameters of the cap portions 42, 52 are selected to provide annular surfaces adequate to abut against the upper and lower surfaces of the control arm. In the illustrated example, with $D_t$ equal to 3.475" and the outer diameter $D_o$ equal to 2.913" and the head or cap portion 42 has a diameter equal to 3.475", so that the annular dimension of the overhang or portion that abuts the surface of the control arm portion 16 is approximately equal 0.562". This number is not critical and may be modified to suit a particular control arm.

It will be evident to those skilled in the art that the two-piece vertical control arm bushing in accordance with the present invention provides a simple, inexpensive, easy-to-install vertical control arm bushing that can be installed with tools conventionally found in service stations and without the need of heavy duty presses.

While the invention has been shown and described with reference to certain embodiments thereof, it will be understood by those skilled in the art that various changes in form and detail may be made therein without departing from the spirit and scope of the invention as defined by the appended claims and their equivalents.

The invention claimed is:

1. A bushing, for use with a control arm having upper and lower surfaces and a circular opening defining a vertical axis and a diameter $D_c$, comprises
   (a) first and second mating segments defining an axis when mated and assembled to form a portion to be received within the circular opening and having an outer diameter substantially corresponding to the diameter $D_c$, each segment including a cap or head portion associated with each of said segments and having a diameter greater than $D_c$ and dimensioned to abut against one of the upper and lower surfaces of the control arm and having a central bore having a predetermined diameter; and
   (b) a bushing sleeve having a length substantially equal to a fully mated bushing along said vertical axis and an outer diameter greater than said predetermined diameter of said central bore to allow said bushing sleeve to be inserted through said central bore in a press fit relationship in order to maintain said mating segments in assembled condition, said two segments of the control arm bushing being suitable to be inserted into said circular opening of the control arm from opposite sides of the control arm and coaxially aligned prior to being mated, said bushing sleeve being inserted through said central bore after said segments have been mated to substantially immobilize said first and second segments when they are in contact with the control arm and prevented from undesirably separating by moving in opposite directions along said axis.

2. The bushing as defined in claim 1, wherein said first segment is a female segment having an annular portion defining an outer diameter $D_o$ and a cylindrical inner chamber C having an inner diameter $D_i$.

3. The bushing as defined in claim 2, wherein said second segment is a male segment having an annular portion defining an outer diameter $d_o$ greater than $D_i$ to provide a press fit when said segments are mated.

4. The bushing as defined in claim 3, said inner chamber C has an axial length or height h that is greater than an axial length or height of said annular portion of said first female segment, said inner chamber C axially extending into said cap or head portion associated with said first female segment.

5. The bushing as defined in claim 1, wherein said cap or head portions are integrally formed with associated segments.

6. The bushing as defined in claim 1, wherein said cap or head portions are formed with tapered or beveled surfaces at radically outer surfaces that do not contact the control arm when the bushing is assembled on the control arm.

7. The bushing as defined in claim 1, wherein said segments are made of rubber.

8. The bushing as defined in claim 1, wherein said bushing sleeve is provided with chamfers or bevels at opposing axial ends.

9. The bushing as defined in claim 1, wherein said bushing sleeve is made of steel.

10. A control arm comprises
   a member having upper and lower surfaces and a circular opening defining a vertical axis and a diameter $D_c$;
   first and second mating segments defining an axis when mated and assembled to form a portion to be received within said circular opening, said first segment comprising a female segment having an outer diameter substantially corresponding to the diameter $D_c$, each segment including a cap or head portion having a diameter greater than $D_c$ and dimensioned to abut against one of said upper and lower surfaces of the control arm, said second segment comprising a male segment having a central bore having a predetermined diameter;

a bushing sleeve having a length substantially equal to a fully mated bushing along said vertical axis and an outer diameter greater than said predetermined diameter of said central bore to allow said bushing sleeve to be inserted through said central bore in a press fit relationship in order to maintain said mating segments in assembled condition, said two segments being suitable to be inserted into said circular opening of the control arm from opposite sides of the control arm and coaxially aligned prior to being mated, said bushing sleeve being inserted through said central bore after said first and second segments have been mated to substantially immobilize said first and second segments when they are in contact with the control arm and prevented from undesirably separating by moving in opposite directions along said axis.

11. The control arm as defined in claim 10, wherein said female segment has an annular portion defining an outer diameter $D_o$ and a cylindrical inner chamber C having an inner diameter $D_i$.

12. The control arm as defined in claim 11, wherein said male segment has an annular portion defining an outer diameter $d_o$ greater than $D_i$ to provide a press fit when said segments are mated.

13. The control arm as defined in claim 12, said inner chamber C has an axial length or height h that is greater than an axial length or height of said annular portion of said first female segment, said inner chamber C axially extending into said cap or head portion associated with said first female segment.

14. The control arm as defined in claim 10, wherein said cap or head portions are integrally formed with associated segments.

15. The control arm as defined in claim 10, wherein said cap or head portions are formed with tapered or beveled surfaces at radically outer surfaces that do not contact the control arm when the bushing is assembled on a control arm.

16. The control arm as defined in claim 10, wherein said segments are made of rubber.

17. The control arm as defined in claim 10, wherein said bushing sleeve is provided with chambers or bevels at opposing axial ends.

18. The control arm as defined in claim 10, wherein said bushing sleeve is made of steel.

19. A method of assembling a bushing, for use with a control arm having upper and lower surfaces and a circular opening defining a vertical axis and a diameter $D_c$, first and second mateable segments defining an axis when mated and assembled to form a portion to be received within the circular opening, said first segment comprising a female segment having an outer diameter substantially corresponding to the diameter $D_c$, each segment including a cap or head portion associated with each of said segments and having a diameter greater than $D_c$ and dimensioned to abut against one of said upper and lower surfaces of the control arm and having a central bore having a predetermined diameter;

a bushing sleeve wherein said second segment comprises a male segment having a length substantially equal to a fully mated bushing along said vertical axis and an outer diameter greater than said predetermined diameter of said central bore to allow said bushing sleeve to be inserted through said central bore in a press fit relationship in order to maintain said mating segments in assembled condition, the method comprising the steps of inserting the two mateable segments through the circular opening from opposite sides of the control arm and mating said segments to position said caps or heads of said segments into contact with the control arm; and inserting said bushing sleeve through said central bore to substantially immobilize said first and second segments when they are in contact with the control arm and prevented from undesirably separating by moving in opposite directions along said axis.

20. The method as defined in claim 19, wherein axially inward pressure is applied to mate said segments and to insert said bushing sleeve through said central bore to lock said segments relative to each other by providing press-fits therebetween.

* * * * *